United States Patent
Raissinia et al.

(10) Patent No.: US 6,430,193 B1
(45) Date of Patent: Aug. 6, 2002

(54) COMMUNICATION OF PHYSICAL LAYER CONTROL PARAMETERS

(75) Inventors: Ali Raissinia, Monte Sereno; Michael Pollack, Cupertino; Vincent K. Jones, IV, Redwood Shroes; Gregory G. Raleigh, El Granada, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/348,647

(22) Filed: Jul. 6, 1999

(51) Int. Cl.[7] .............................. H04L 12/413; H04J 3/22
(52) U.S. Cl. ....................... 370/448; 370/469; 370/476; 714/752
(58) Field of Search ................................. 370/318, 328, 370/329, 338, 347, 349, 445, 447, 469, 448, 465, 421, 476, 474, 463, 342; 455/69, 70; 375/241; 714/756, 776, 784, 752; 709/217

(56) References Cited

U.S. PATENT DOCUMENTS

| | | | |
|---|---|---|---|
| 5,056,109 A | | 10/1991 | Gilhousen et al. .............. 375/1 |
| 5,369,671 A | * | 11/1994 | Yehushua et al. .............. 375/94 |
| 5,465,398 A | | 11/1995 | Flammer ....................... 455/69 |
| 5,636,140 A | * | 6/1997 | Lee et al. ............... 364/514 C |
| 5,838,268 A | * | 11/1998 | Frenkel ........................ 341/11 |
| 5,886,989 A | * | 3/1999 | Evans et al. ................. 370/347 |
| 5,995,496 A | | 11/1999 | Honkasalo et al. ......... 370/318 |
| 6,023,467 A | * | 2/2000 | Abdelhamid et al. ....... 370/395 |
| 6,070,246 A | * | 6/2000 | Beser .......................... 713/201 |
| 6,075,787 A | * | 6/2000 | Bobeck et al. .............. 370/395 |

OTHER PUBLICATIONS

"Data–over–cable services interface specifications", 1997, Radio Frequency Interface Specification, Cable Television Laboratories.

* cited by examiner

Primary Examiner—Alpus H. Hsu
Assistant Examiner—Duc Ho
(74) Attorney, Agent, or Firm—Ritter, Lang & Kaplan LLP

(57) ABSTRACT

Systems and methods are provided for transferring physical layer control information from a central access point to individual subscriber units while maintaining transparency to higher layers. Adaptation of wireline MAC protocols to wireless applications is greatly facilitated. Subscriber unit power level may be controlled from the central access point.

32 Claims, 5 Drawing Sheets

COMMUNICATION OF PHYSICAL LAYER CONTROL PARAMETERS

STATEMENT OF RELATED APPLICATIONS

The present application is related to the subject matter of the following co-filed, co-assigned applications.

POWER CONTROL IN CONJUNCTION WITH A WIRELINE MAC PROTOCOL;

U.S. patent app. Ser. No. 09/348,644, REALTIME POWER CONTROL IN OFDM SYSTEMS;

U.S. patent app. Ser. No. 09/348,719, POWER REGULATION USING MULTI-LOOP CONTROL;

U.S. patent app. Ser. No. 09/348,645, OPTIMAL USE OF REQUEST ACCESS TDMA SLOTS FOR AUTOMATIC LEVEL CONTROL;

U.S. patent app. Ser. No. 09/348,727, POLLING FOR TRANSMISSION POWER CONTROL.

All of the related applications are incorporated by reference herein for all purposes.

BACKGROUND OF THE INVENTION

The present invention relates to digital communication systems and more particularly to systems and methods for transferring information related to control of the physical layer.

A point-to-multipoint wireless communication system represents a potentially effective solution to the problem of providing broadband network connectivity to a large number of geographically distributed points. Unlike optical fiber, DSL, and cable modems there is no need to either construct a new wired infrastructure or substantially modify a wired infrastructure that has been constructed for a different purpose.

In order to conserve scarce spectrum, the data communication devices of a point-to-multipoint wireless communication system may share access to a common frequency. In a typical scenario, one or more frequency channels are allocated to downstream broadcast communication from a central access point to a plurality of subscriber units. One or more separate frequency channels are allocated to upstream communications from the subscriber units to the central access point. For upstream communication, a medium access control (MAC) protocol determines which subscriber unit is permitted to transmit at which time so as not to interfere with transmissions from other subscriber units.

For a given upstream frequency, the time domain is divided into frames which are typically of equal duration. Each frame represents an individually allocable unit in the time domain. One subscriber unit transmits in each frame. Reservations for transmission in a particular frame are made by the central access point and distributed in broadcast downstream transmissions.

It is useful to model the design of a network as consisting of multiple layers. Layers are arrange in a hierarchical fashion with each layer being built on top of a layer below it. The lowest layer is known as the physical layer and controls interaction with the physical medium. Each layer performs functions required by the layer above it and shields the layer above it from the details of implementation. A hardware or software entity implementing a given layer at a particular node of a network interacts with other entities of the same layer operating at other nodes in the network. Except for the physical layer, they do not interact directly but rather via the lower level layers at their respective nodes. In a point-to-multipoint communication system, various entities that implement the MAC protocol are collectively referred to as the MAC layer. The MAC layer is directly above the physical layer.

In many point-to-multipoint communication systems including, e.g., a data over cable system, the MAC layer is responsible for other functions besides coordinating the timing of upstream transmission so that subscribers do not interfere with one another. For example, the MAC layer may be responsible for regulating the upstream power transmission of individual subscriber units to prevent saturation of the central access point receiver and to minimize interference to unintended receivers. In order to coordinate upstream transmission in the time domain, it may also be necessary to establish the propagation delay between the central access point and individual subscriber units. The process of establishing these propagation delays is known as ranging and may be also a function of the MAC layer.

The discussion so far has concerned point-to-multipoint wireless communication systems. Cable modem systems also involve access to a shared medium, the cable infrastructure. It would be desirable to simply adopt a MAC protocol already developed for cable applications to the wireless context. One such protocol that has been developed is referred to as the MCNS protocol. The MCNS protocol is described in Data-Over-Cable Service Interface Specifications, Radio Frequency Interface Specification, SP-RFI-I04-980724, (Cable Television Laboratories, 1997), the contents which are herein incorporated by reference.

A cable MAC layer like MCNS is a already implemented in low cost chip sets. The operational characteristics of MCNS are well known. Higher layer protocol hardware and software has been developed to interact with MCNS. Furthermore, it is desirable to maintain parts commonality between wireless modems and cable modems to the extent possible. Unfortunately, many features of wireline MAC protocols are not appropriate for the wireless context. For example, a wireless communication system may require much more frequent updates of subscriber unit power level than does a wireline system to accommodate changes in propagation conditions. This creates an excessive processing burden on the wireline MAC processor. Also, subscriber units periodically transmit to the central access point even when they have no new information to transmit solely for the purpose of providing a power measurement level update. Each such transmission by a subscriber unit requires an entire MAC frame. Frequent updates of power control information necessitated by the wireless channel consume precious bandwidth.

One solution to this problem of providing adequately frequent upstream power measurements in a system employing a wireline MAC protocol is described in the patent application entitled WIRELESS POWER CONTROL IN CONJUNCTION WITH A WIRELINE MAC PROTOCOL, U.S. application Ser. No. 09/348,646. In the system described there, upstream MAC frames are further subdivided into subframes that are controlled by the physical layer rather than by the MAC layer. Some of the subframes are allocated to upstream power measurements. However, creating such a physical layer frame structure requires downstream transmission of the physical layer control information. For example, there must be scheduling information transmitted to the subscriber units to define access to the physical layer frames.

Prior art implementations of point-to-multipoint communication system downstream physical layers have focused on simply transferring information generated by the MAC layer from the central access MAC layer entity to one or more subscriber unit MAC layer entities. What is needed is a system that transfers physical layer control information from the central access point to individual subscriber units with complete transparency to the operation of the MAC layer.

SUMMARY OF THE INVENTION

In accordance with one embodiment on the present invention, systems and methods are provided for transferring physical layer control information from a central access point to individual subscriber units while maintaining transparency to higher layers. Adaptation of wireline MAC protocols to wireless applications is greatly facilitated. Subscriber unit power level may be controlled from the central access point via physical layer communications.

In accordance with the first aspect of the present invention, a method for communicating data from the central access point to a plurality of subscriber units includes providing a physical layer system at the central access point to implement digital communication between the central access point and the plurality of subscriber units. A physical layer system implements a central access point portion of a physical layer of the digital communication system. The method further includes transferring data from a layer above the physical layer to the physical layer system. Within the physical layer system, data is divided into codewords for encoding prior to transmission. Physical layer management information generated within the physical layer system and intended for transmission to a physical layer entity within at least one of the subscriber units is included with at least one of the codewords. The codewords are transmitted to the plurality of subscriber units.

Further understanding of the nature and advantages of the invention herein may be realized by reference to the remaining portions of the specification and the attached drawings.

DESCRIPTION OF SPECIFIC EMBODIMENTS

Figure 1:
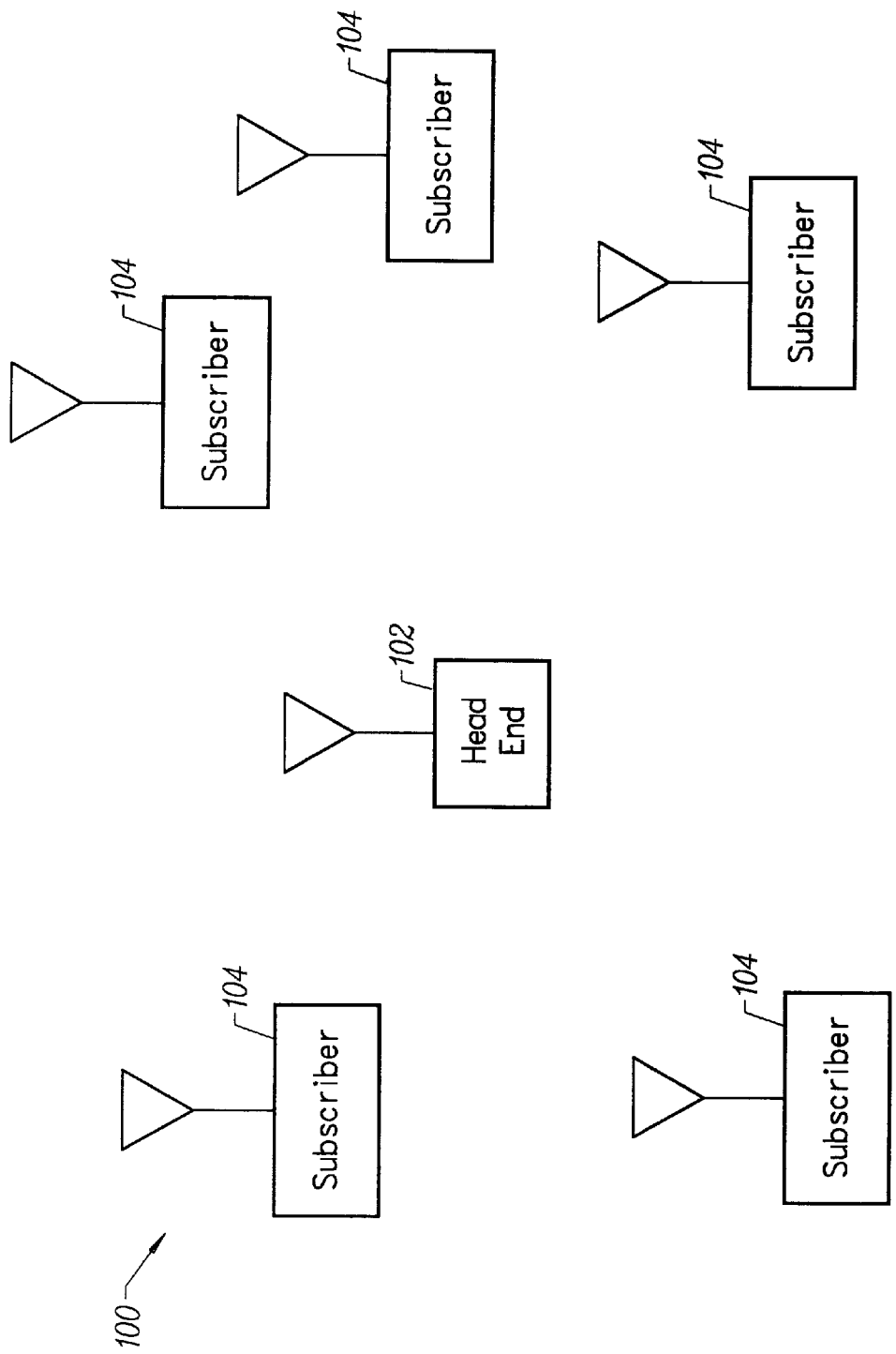
FIG. 1 depicts a point-to-multipoint wireless communication system according to one embodiment of the present invention.

FIG. 1 depicts a point-to-multipoint wireless communication network 100 suitable for implementing one embodiment of the present invention. Network 100 includes a central access point or headend 102 and multiple subscriber units 104. All communication is typically either to or from central access point 102. Communication from headend 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. In alternate embodiments, subscriber units 104 may communicate with one another directly.

Each of one or more upstream frequencies is common to multiple subscriber units. To prevent collisions between subscriber units in accessing the shared medium, a medium access control (MAC) protocol is provided. According to one embodiment of the present invention, a MAC protocol intended for data transmission over cable systems is used to coordinate upstream communications in wireless network 100. An exemplary MAC protocol of this type is the so-called MCNS protocol described in Data-Over-Cable Service Interface Specifications, Radio Frequency Interface Specification, SP-RFI-I04-98724, (Cable Television Laboratories, 1997), the contents are herein incorporated by reference.

MCNS employs a time domain multiple access (TDMA) scheme to allocate access to the shared upstream frequency among the multiple subscriber units 104. The entity controlling operation according to the MAC protocol at central access point 102 and subscriber units 104 is referred to collectively as the MAC layer. This identifies these entities as collectively representing a layer in a multi-layer communication model. In reference to the well-known OSI multi-layer model of data communications, the MAC layer as it is discussed here corresponds to a lowest sublayer of the data link layer. Underneath the MAC layer is the physical layer which is responsible for transmitting and receiving bits over the wireless channel. The MAC layer implements a TDMA scheme for upstream communication. Each of one or more upstream frequencies is divided into a series of frames or minislots in the time domain.

MCNS also implements other management functions related to the operation of wireless communication network 100. For example, MCNS provides for control of subscriber unit output power. In order to facilitate operation of the TDMA scheme, MCNS also provides for ranging functions that establish the propagation delays between central access point 102 and subscriber units 104. Centralized control of subscriber unit output power is necessary so that subscriber unit transmissions do not saturate the receiver at central access point 102. The ranging process wherein propagation delays are established is necessary so that scheduled transmission times for individual subscriber units take into account differences in propagation delay between the various subscriber units and central access point 102.

According to the present invention, one or more aspects of operating wireless communication network 100 are managed by the physical layer and are transparent to the MAC layer. These management functions require downstream communication between entities operating at the physical layer at central access point 102 and at least one of subscriber units 104. The transfer of this control information within the physical layer is then preferably transparent to the MAC layer and other higher layers.

Figure 2:
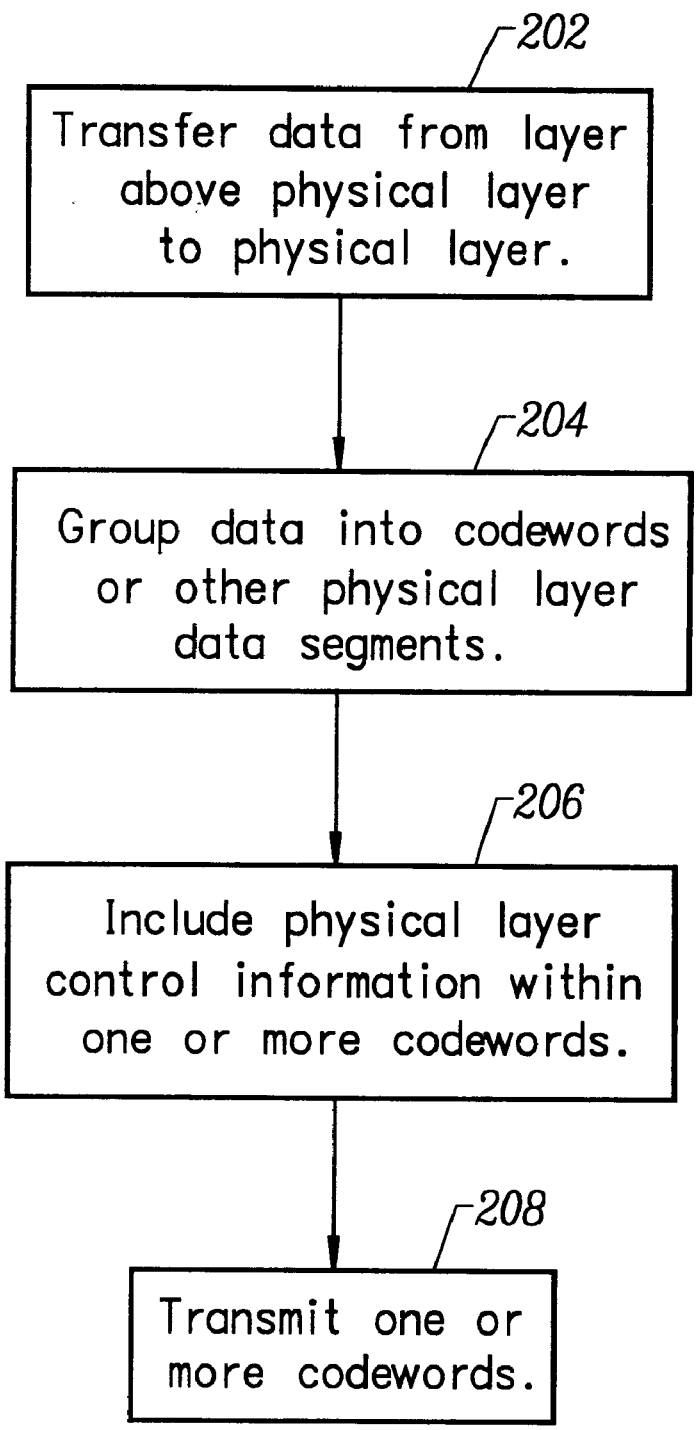
FIG. 2 is a flowchart generally describing steps of implementing a downstream physical layer in a point-to-multipoint communication system according to one embodiment of the present invention.

FIG. 2 is a flow chart generally describing steps of transferring physical layer control information downstream according to one embodiment of the present invention. The primary responsibility of the physical layers is to provide a pipeline transferring data between entities operating above the physical layer. At step 202, data is transferred from layer above the physical layer, e.g., the MAC layer, to the physical layer. This data may include, e.g., application data, voice, video, and/or MAC layer management data and/or any other data exchanged between layers above the physical layer.

One embodiment of the present invention takes advantage of segmentation of data to facilitate transmission by the physical layer. For example to facilitate the detection and correction of errors, the physical layer may divide data into segments known as codewords. Each codeword is a group of bytes representing a simultaneous input to an encoding process. An example of such an encoding process is a Reed-Solomon encoding process. A Reed-Solomon encoding process accepts as its input an input codeword and generates an output encoded codeword. Each output codeword includes the contents of the corresponding input codeword with an additional series of bits acting as a checksum. The checksum allows the corresponding decoding process to detect and/or correct errors caused by impairments in the communication channel.

Step 204 groups the higher layer data into codewords. According to the present invention, physical layer control information may be included within one or more of the codewords. A special subsegment may be provided within the codeword structure to provide space for this physical layer control information.

Physical control information is included in one or more codewords at step 206. This physical layer control information may include, e.g., power adjustment information, scheduling information for a physical layer TDMA frame structure, and/or frequency control information instructing one or more subscriber units to change their transmission and/or reception frequencies.

At step 208, the codewords are transmitted. Transmission of the codewords from central access point 102 to one or more subscriber units 104 typically involves other various analog and digital processing steps. For example there may be further encoding steps to help ameliorate channel impairments. An orthogonal frequency division multiplexing (OFDM) system may be implemented by use of the inverse Fast Fourier Transform (IFFT). Also digital signals will typically be converted to analog signals and the analog signals will be upconverted for transmission at the appropriate radio frequency.

Figure 3:
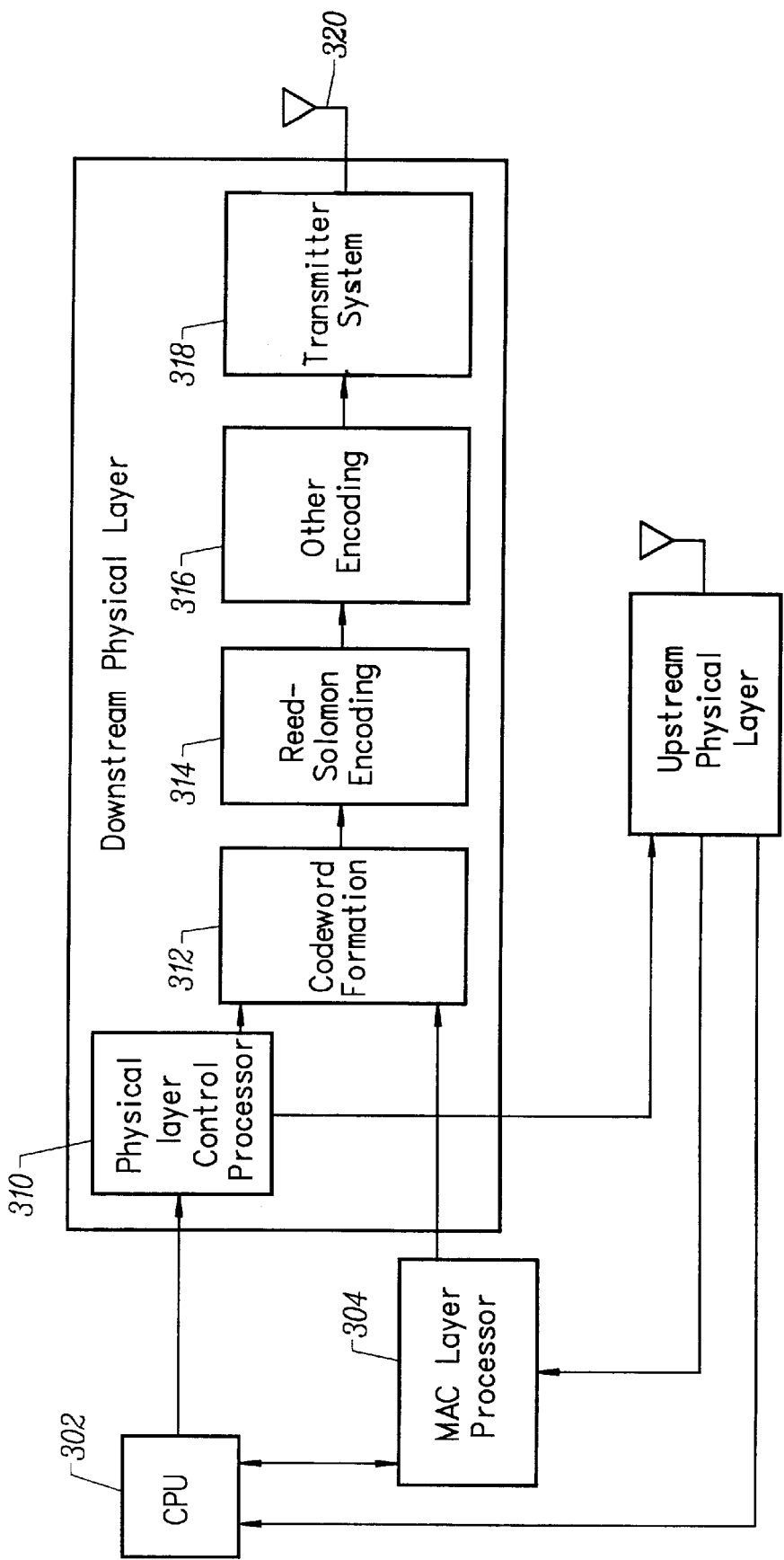
FIG. 3 depicts elements of a central access point according to one embodiment of the present invention.

FIG. 3 depicts elements of central access point 102. A CPU 302 coordinates overall operation of central access point 102. A MAC layer processor 304 implements the central access point operation of the MAC protocol for both the upstream and downstream directions. Besides coordinating MAC layer operation, MAC layer processor 304 also acts as an interface in relaying data to and from higher layer entities at the central access point. In MCNS applications, central access point MAC layer processor 304 may be a BCM 3210B integrated circuit available from Broadcom, Inc. of Irvine, Calif.

An upstream physical layer block 306 is responsible for receiving signals from individual ones of subscriber units 104. Upstream physical layer block 306 transfers data received from subscriber units 104 to MAC layer processor 304. Some data related to operation of the physical layer such as power measurement information indicating received power for one or more subscribe units 104, propagation delay information, etc., may be transferred directly to CPU 302 from upstream physical layer block 306. Details of the operation of representative implementations of upstream physical layer block 306 can be found in the patent application entitled WIRELESS POWER CONTROL IN CONJUNCTION WITH A WIRELINE MAC PROTOCOL, U.S. application Ser. No. 09/348,646 and in the application entitled REALTIME POWER CONTROL IN OFDM SYSTEMS, U.S. application Ser. No. 09/348,644.

A downstream physical layer block 308 performs transmitter processing and RF signal handling for a downstream channel. FIG. 3 depicts a downstream physical layer block for a single downstream channel but block 308 may of course be duplicated for multiple downstream frequencies. Within downstream physical layer block 308, a central access point physical layer control processor 310 receives physical layer control information from CPU 302 or upstream physical layer block 306 and processes this information. For example, central access point physical layer control processor 310 may receive power measurements for individual subscriber units received from upstream physical layer block 306 either directly or via CPU 302. Central access point physical layer control processor 310 may then formulate power adjustment information for controlling individual subscriber units based on these power measurements.

In one embodiment central access point physical layer processor 310 may be combined in functionality with another physical layer control processor within upstream physical layer block 306 to provide overall control of the physical layer for both downstream and upstream directions. Also, in one embodiment CPU 302 may absorb the functions of central access point physical layer processor 310 and directly provide physical control layer information to be transmitted downstream. A codeword formation block 312 accepts physical layer control information from central access point physical layer control processor 310 and also accepts MAC and higher layer data from MAC layer processor 304. Codeword formation block 312 forms input data into segments for further processing. In one embodiment the segments are codewords that represent input to an encoding process such as a Reed-Solomon encoding process. The present invention, however, does not require that the segments be defined in terms of the input to an encoding process. The segments may represent any division of data to facilitate processing by the physical layer.

In one embodiment, each codeword formed by codeword formation block 312 includes 232 bytes. Of these 232 bytes, 1 byte is used for synchronization and 229 bytes are reserved for MAC layer and higher layer data received from MAC layer processor 304. The remaining 2 bytes are allocated to the physical layer control information output by central access point physical layer control processor 310. The data generated by MAC layer processor 304 and included within the codewords may be organized in accordance with the MAC layer protocol. The boundaries of downstream MAC layer frames need not coincide with the boundaries of codewords.

Individual downstream MAC layer frames may include addresses selecting particular intended subscriber unit receivers or indicating that the MAC layer frame is intended as a broadcast to be processed by all subscriber units. A Reed-Solomon encoding block 314 applies the Reed-Solomon code to the input codewords to generate output codewords. Each output codeword may include the 232 bytes of the input codeword and additionally a 20 byte checksum so that the total codeword length is 252 bytes. Additional encoding block 316 may apply other encoding techniques, e.g., convolutional coding, block coding, turbo coding, etc. A transmitter system 318 performs the other analog and digital signal processing steps necessary to generate an RF signal for transmission via an antenna 320. Transmitter system 318 performs operations related to modulation, conversion of a digital baseband signal to an analog signal, upconversion of the analog signal to intermediate frequency (IF), filtering and further processing of the IF signal, upconversion of the IF signal to a radio frequency (RF), and further amplification and filtering of the RF signal.

Figure 4:
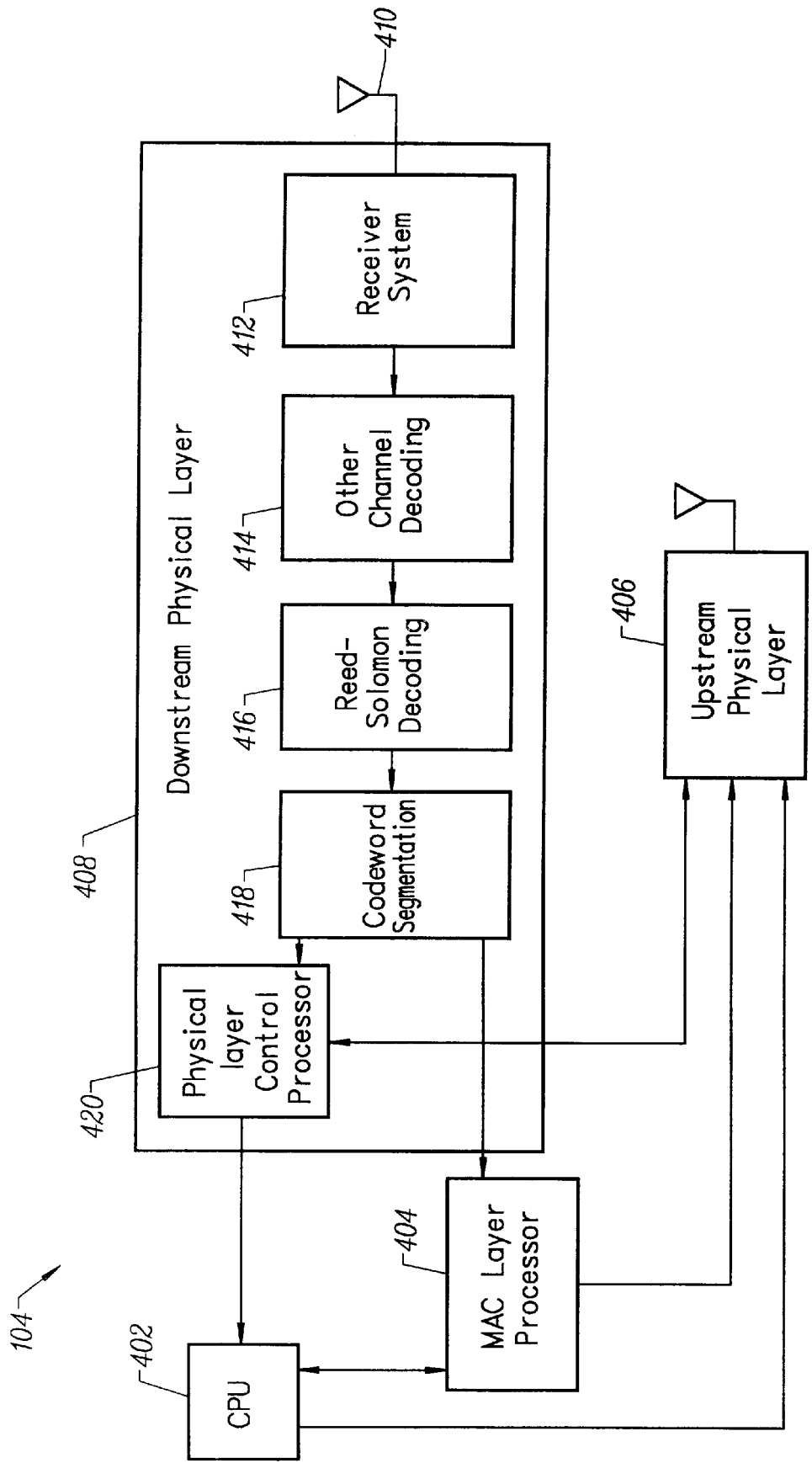
FIG. 4 depicts elements of a subscriber unit according to one embodiment of the present invention.

FIG. 4 is a diagram of elements of a representative one of subscriber units 104. A CPU 402 controls overall operation. A MAC layer processor 404 implements subscriber unit operation of the MAC protocol for both upstream and downstream directions and acts as a data interface to higher layers. In MCNS applications, subscriber unit MAC layer processor 404 may be a BCM 3300 integrated circuit provided by Broadcom. An upstream physical layer block 406 transmits information provided by MAC layer processor 404 to central access point 102. Upstream physical layer block 406 may also transmit physical layer control information provided by CPU 402 or physical layer control information generated in response to input provided by CPU 402. Examples of the upstream transmission of physical layer control information are disclosed in the patent application entitled WIRELESS POWER CONTROL IN CONJUNCTION WITH A WIRELINE MAC PROTOCOL, U.S. application Ser. No. 09/348,646 and in the patent application entitled REALTIME POWER CONTROL IN OFDM SYSTEMS, U.S. application Ser. No. 09/348,644.

A downstream physical layer block 408 performs receiver signal processing and RF signal handling for downstream communication from central access point 102. An antenna 410 collects signals received from central access point 102. A receiver system 412 performs initial amplification and filtering on the received RF signals, converts the RF signals to an intermediate frequency (IF), filters and otherwise processes the IF signal, downconverts the IF signal to a baseband signal, converts the baseband signal to a series of digital samples, and performs other functions such as baseband filtering and demodulation. A channel decoding stage 414 decodes to remove, e.g., convolutional coding, block coding, turbo coding, etc.

A Reed-Solomon decoding block 416 accepts as input individual codewords that have been encoded according to a Reed Solomon encoding process. In one embodiment, these are 252 byte long codewords including checksum information. Reed-Solomon decoding block 416 removes the checksum bytes and uses them to detect and correct errors in the other bytes. The output of Reed-Solomon encoding stage 416 is a series of codewords that have had their checksums removed.

Each such codeword preferably includes a subsegment devoted to physical layer control information. In one embodiment, this is the 2 byte subsegment referred to in reference to codeword formation block 312. A codeword segmentation block 418 divides each codeword into a subsegment containing MAC layer and higher layer information that is transferred to MAC layer processor 404, and a subsegment containing physical layer control information that is directed to a subscriber unit physical layer control processor 420.

Subscriber unit physical layer control processor 420 may be part of an overall physical layer control processor that controls all physical layer operations both upstream and downstream at subscriber unit 1 04. Alternatively, the functionality of subscriber unit physical layer control processor 420 may be integrated within CPU 402 and physical layer control data from the physical layer control subsegment of the successive codewords may be transferred directly from codeword segmentation block 418 to CPU 402. Subscriber unit physical layer control processor 420 may receive power adjustment information for upstream transmission. This power adjustment information may be transferred to CPU 402. Subscriber unit physical layer control processor 420 may compute a power adjustment using techniques described in the patent application entitled POWER REGULATION USING MULTI-LOOP CONTROL.

Subscriber unit physical layer control processor 420 may also process downstream scheduling messages related to physical layer framing, wherein upstream MAC layer frames are subdivided into physical layer frames. Subscriber unit physical layer control processor 420 may examine schedules received from central access point 102 to determine in which physical layer frames this particular subscriber unit is scheduled for transmission. Subscriber unit physical layer control processor 420 may also detect requests for upstream transmission of power measurement information by this particular subscriber unit. Upstream physical layer transmission operations will occur in response to the downstream physical layer control information received by subscriber unit physical layer control processor 420.

There are many examples of physical layer control information that may be transferred within a subsegment of a codeword or a subsegment of any type of segment employed to facilitate physical layer communication. One example is power adjustment information. The power adjustment information may be a multibit number indicating a positive or negative number of decibels by which the subscriber unit is to regulate its upstream transmission power. Alternatively, the power adjustment information may be a raw power measurement or channel response estimate based on subscriber unit transmissions.

Another example of the use of downstream transmission of physical layer control information is distributing frequency coordination information. In order to operate in the presence of interference, it may be useful to periodically adjust the frequencies of upstream and downstream operation in wireless communication network 100. Optimal frequencies may be determined at central access point 102 by central access point physical layer control processor 310 and then distributed downstream to the various subscriber units 104. Alternatively, a hopping code may be distributed to subscriber units 104. Subscriber units 104 may themselves then determine their frequencies of operation in accordance with the hopping code.

Another example of physical layer control information that may be transferred downstream arises in the context of handling collisions that occur when multiple subscriber units transmit access requests upstream simultaneously causing what is known as a collision. Although data transmission are scheduled so that individual subscriber units do not transmit simultaneously, requests for access to the medium may collide.

Subscriber units will detect the collision and then repeat the access request later but to prevent further collisions the subscriber units will delay their retransmission of access requests by units of time known as a backoff value. The backoff value is chosen separately at each subscriber unit according to a pseudo-random function. The input to the pseudo random function is a parameter knows as the backoff parameter. This backoff parameter is generated at central access point 102 and distributed to the individual subscriber units 104. The backoff parameter is an example of a quantity that may be distributed within the codeword subsegment dedicated to physical layer control information.

In the system described in the patent application entitled REAL TIME POWER CONTROL IN OFDM SYSTEMS, U.S. application Ser. No. 09/348,644, access requests originating with multiple subscriber units are distributed among various frequency domains subchannels as established within an OFDM system. If two or more access requests collide due to simultaneous transmission on the same subchannel, it is possible that the overall power received during the access request frame will saturate the receiver. It is then desirable to instruct all of the subscriber units to reduce the power level used for access requests. The reduction of output power is.

Figure 5A:
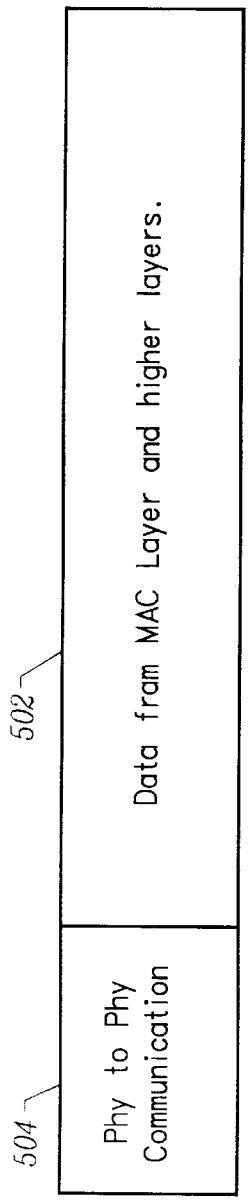
FIG. 5A depicts organization of a codeword to facilitate downstream communication of physical layer control information according to one embodiment of the present invention.

FIG. 5A depicts organization of a codeword to facilitate downstream communication of physical layer control information. A first subsegment 502 includes data being transferred from MAC layer entities and higher layer entities at central access point 102 to corresponding entities at one or more of subscriber units 104. In one embodiment, subsegment 502 includes 229 bytes. A second subsegment 504 includes physical layer control information. In one embodiment, second subsegment 504 is prepended to the beginning of subsegment 502. It will be understood, however, that the information in subsegment 504 may be appended to the end of the codeword or distributed within the codeword in any way.

Figure 5B:
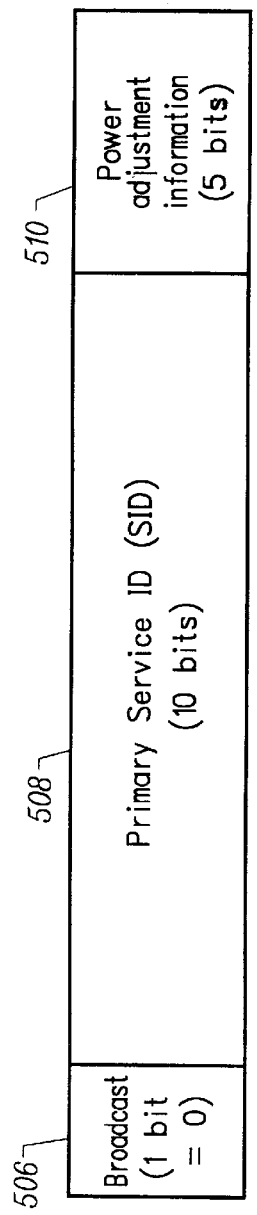
FIG. 5B depicts the organization of power control information within a codeword according to one embodiment of the present invention.

FIG. 5B depicts representative contents of subsegment 504 wherein power control information is transmitted to a particular subscriber unit. A broadcast field 506 is a single bit that defines whether the information is being directed to a single subscriber unit or all subscriber units. In FIG. 5B, this bit has the value 0 to indicate that the power control information is being directed to a single subscriber unit. An address field 508 includes a so-called primary service ID number. This primary service ID number is an address of an individual subscriber unit as defined by the MAC layer. For MCNS, this ID is a 10 bit number. A power adjustment field 510 holds a power adjustment indicator. The power adjustment indicator is a 5 bit number representing the power error in decibels. The power adjustment indicator may be a positive or a negative number and is represented in 2's complement form.

Figure 5C:
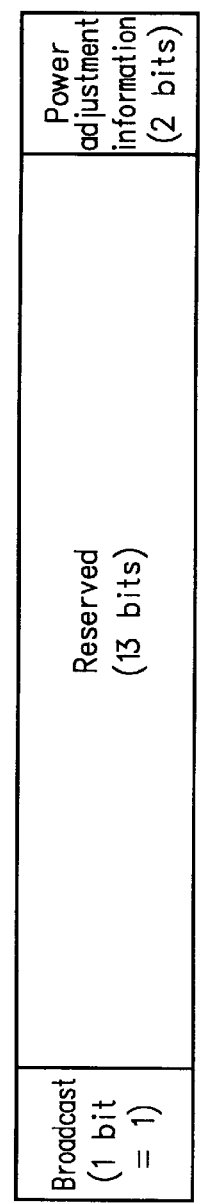
FIG. 5C depicts the organization of power control information for access requests according to one embodiment of the present invention.

FIG. 5C depicts representative contents of subsegment 504 wherein power control information for access requests is being broadcast to all subscriber units. The single bit of broadcast field 506 now has the value 1 to indicate that the contents of subsegment 504 are intended for all subscriber units. A field 512 includes 13 reserved bits. A power adjustment field 514 holds a power adjustment indicator representing a desired adjustment to the power level used by all subscriber units for access requests. This indicator has 2 bits representing the desired power adjustment in 2's complement form.

It can be seen that physical layer control information may be transmitted downstream from central access point 102 to subscriber units 104 in a way that is transparent to higher layers. In effect a logical control channel has been created between from the central access point physical layer entity to the subscriber units' physical layer entities.

It is understood that the examples and embodiments described herein are for illustrative purposes only and various modifications are changes in light thereof will be suggestive to persons skilled in the art and are to be included within the spirit and pervue of this application and scope of the appended claims. For example, the present invention may be applied to wireline systems. All publications, patents, and patent applications cited herein are hereby incorporated by reference.

What is claimed is:

1. In a point to multipoint communication system, a subscriber unit comprising:

a receiver system that receives a plurality of codewords from a central access point;

a decoder block that decodes said codewords, obtaining decoded data for each of said codewords; and a data segmentation block that extracts from decoded data of one of said codewords, first data and second data, said first data being transferred to a protocol entity within said subscriber unit implementing a layer above a physical layer of said communication system, said second data comprising physical layer control information;

and wherein operation of said protocol entity is defined by the Data Over Cable Service Interface Specifications (DOCSIS).

2. The subscriber unit of claim 1 wherein said second data comprises an identifier indicating an intended recipient of said physical layer control information.

3. The subscriber unit of claim 1 wherein said physical layer control information comprises a collision back off parameter.

4. The subscriber unit of claim 1 wherein said physical layer control information comprises a scheduling message for allocating access to physical layer frames within a MAC layer frame.

5. The subscriber unit of claim 1 wherein said physical layer control information comprises power adjustment information.

6. The subscriber unit of claim 1 wherein said physical layer control information comprises a frequency adjustment command.

7. The subscriber unit of claim 1 wherein said first data comprises MCNS data.

8. The subscriber unit of claim 1 wherein said receiver system receives said plurality of codewords via a wireless transmission medium.

9. The subscriber unit of claim 1 wherein said receiver system comprises an OFDM receiver system.

10. In a point to multipoint communication system, a method for operating one of a plurality of subscriber units to receive data from a central access point:

receiving a plurality of codewords from said central access point, said codewords being encoded in accordance with an error correction coding scheme;

dividing data received within one of said codewords into a first subsegment and a second subsegment;

transferring data within said first subsegment to a protocol entity implementing a layer above a physical layer, operation of said protocol entity being specified by the Data Over Cable Service Interface Specifications (DOCSIS); and transferring data within said second subsegment to a physical layer control processor.

11. The method of claim 10 wherein said codewords are encoded in accordance with a Reed-Solomon encoding scheme.

12. The method of claim 10 wherein said data within said second subsegment comprises an address of said one subscriber unit.

13. The method of claim 10 wherein said data within said second subsegment comprises a power adjustment command.

14. In a point to multipoint communication system, a method for operating a central access point to transmit data to a plurality of subscriber units, said method comprising:
within said central access point, transferring first data from an entity implementing a layer above a physical layer to said physical layer, operation of said entity implementing said layer above said physical layer being specified by the Data Over Cable Service Interface Specifications (DOCSIS);
forming codewords for transmission in accordance with an error correction coding scheme wherein at least one of said codewords comprises a first subsegment and a second subsegment, said first subsegment comprising said first data and said second subsegment comprising control data generated within said physical layer at said central access point; and
transmitting said codewords from said central access point.

15. The method of claim 14 wherein said control data comprises a power adjustment command.

16. The method of claim 14 wherein said control data comprises a power adjustment command to control power of access requests.

17. The method of claim 14 wherein transmitting comprises:
employing OFDM to transmit via a wireless transmission medium.

18. In a point to multipoint communication system, a central access point comprising:
a MAC layer system implementing a MAC layer protocol of said communication system, said MAC layer protocol being specified by the Data over Cable Service Interface Specifications (DOCSIS);
a physical layer control processor that generates physical layer control information; and
a segment formation block that generates physical layer data segments to be transformed into signals to be transmitted via a transmission medium, at least one of said data segments including both data received from said MAC layer system and said physical layer control information; and
an encoding block that encodes said data segments individually according to an encoding scheme to form codewords.

19. The central access point of claim 18 wherein said at least one data segment comprises a first subsegment comprising said data received from said MAC layer system and a second subsegment comprising said physical layer control information.

20. The central access point of claim 18 wherein said second subsegment further comprises an identifier indicating an intended recipient of said physical layer control information.

21. The central access point of claim 18 wherein said physical layer control information comprises a collision back off parameter.

22. The central access point of claim 18 wherein said physical layer control information comprises a scheduling message for allocating access to physical layer frames within a MAC layer frame.

23. The central access point of claim 18 wherein said physical layer control information comprises a power adjustment command.

24. The central access point of claim 18 wherein said physical layer control information comprises a frequency adjustment command.

25. The central access point of claim 18 further comprising an OFDM transmitter that transmits said signals via a transmission medium.

26. The central access point of claim 18 wherein said transmission medium comprises a wireless transmission medium.

27. In a point to multipoint communication system, a central access point comprising:
an encoding processor that encodes a series of codewords according to an encoding scheme for transmission to a plurality of subscriber units;
a physical layer control processor that generates power adjustment information for one of said subscriber units; and
a codeword formation block that forms at least of said codewords by combining 1) power adjustment information controlling power of one of said subscriber units and 2) application data formatted in accordance with DOCSIS protocol by including said power adjustment information in a reserved codeword segment that is allocated to a physical layer control channel.

28. The central access point of claim 27 wherein said encoding scheme comprises a Reed-Solomon coding scheme.

29. In a point to multipoint communication system, a subscriber unit comprising:
a decoding processor that decodes a series of codewords received from a central access point according to a decoding scheme;
a codeword segmentation block that extracts from at least one of said codewords 1) power adjustment information and 2) application data formatted in accordance with DOCSIS protocol, said power adjustment information being extracted from a reserved codeword segment that is allocated to a physical layer control channel; and
a physical layer control processor that controls output power of said subscriber unit in response to said power adjustment information.

30. The subscriber unit of claim 29 wherein said decoding scheme comprises a Reed-Solomon decoding scheme.

31. In a point to multipoint communication system, apparatus for operating one of a plurality of subscriber units to receive data from a central access point:
means for receiving a plurality of codewords from said central access point, said codewords encoded in accordance with an encoding scheme;
means for dividing data received within one of codewords into a first subsegment and a second subsegment;
means for transferring data within said first subsegment to a protocol entity implementing a layer above a physical layer, operation of said protocol entity being specified by Data Over Cable Interface Specifications; and
means for transferring data within said second subsegment to a physical layer control processor.

32. In a point to multipoint communication system, apparatus for operating a central access point to transmit data to a plurality of subscriber units, said apparatus comprising:
means for, within said central access point, transferring first data from an entity implementing a layer above a physical layer to an entity implementing said physical layer, operation of said entity implementing a layer above said physical layer being specified by Data Over Cable Service Interface Specifications;

means for forming data segments for transmission wherein at least one of said segments comprises a first subsegment and a second subsegment, said first subsegment comprising said first data and said second subsegment comprising control data generated within said physical layer at said central access point;

means for encoding said data segments to form codewords; and means for transmitting said codewords from said central access point.

* * * * *